US011315585B2

(12) United States Patent
Kumar (10) Patent No.: US 11,315,585 B2
(45) Date of Patent: Apr. 26, 2022

(54) DETERMINING MUSICAL STYLE USING A VARIATIONAL AUTOENCODER

(71) Applicant: Spotify AB, Stockholm (SE)

(72) Inventor: Aparna Kumar, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/880,908

(22) Filed: May 21, 2020

(65) Prior Publication Data

US 2020/0372924 A1 Nov. 26, 2020

Related U.S. Application Data

(60) Provisional application No. 62/851,487, filed on May 22, 2019.

(51) Int. Cl.
| | | |
|---|---|---|
| G10L 19/22 | (2013.01) | |
| G10L 25/30 | (2013.01) | |
| G06F 16/48 | (2019.01) | |
| G06N 3/04 | (2006.01) | |
| G10L 25/51 | (2013.01) | |

(52) U.S. Cl.
CPC ............. G10L 19/22 (2013.01); G06F 16/48 (2019.01); G06N 3/04 (2013.01); G10L 25/30 (2013.01); G10L 25/51 (2013.01)

(58) Field of Classification Search
CPC ..... G10L 15/063; G10L 15/02; G10L 15/187; G10L 15/193; G10L 15/285; G10L 15/32; G10L 25/30; G10L 2015/025; G10L 15/16; G10L 15/083
See application file for complete search history.

(56) References Cited

U.S. PATENT DOCUMENTS

| | | | |
|---|---|---|---|
| 6,710,822 B1 * | 3/2004 | Walker .................. | G06F 16/785 348/722 |
| 7,974,838 B1 | 7/2011 | Lukin et al. | |
| 8,977,374 B1 * | 3/2015 | Eck ....................... | G11B 27/105 700/94 |
| 9,325,641 B2 | 4/2016 | Haramaty et al. | |

(Continued)

FOREIGN PATENT DOCUMENTS

| | | |
|---|---|---|
| CN | 107093419 A | 8/2017 |
| CN | 109272975 A | 1/2019 |

(Continued)

OTHER PUBLICATIONS

Luo, Yin-Jyun, and Li Su. "Learning Domain-Adaptive Latent Representations of Music Signals Using Variational Autoencoders." ISMIR. 2018. (Year: 2018).*

(Continued)

*Primary Examiner* — Matthew H Baker
(74) *Attorney, Agent, or Firm* — Morgan, Lewis & Bochins LLP (57) ABSTRACT

A computer receives a first audio content item and applies a process to generate a representation of first audio content item. A portion is extracted from the representation of the first audio content item. A first representative vector that corresponds to the first audio content item is determined by applying a variational autoencoder (VAE) to a first segment of the extracted portion the audio content item. The computer stores the first representative vector that corresponds to the first audio content item.

9 Claims, 9 Drawing Sheets

(56) References Cited

U.S. PATENT DOCUMENTS

| | | | |
|---|---|---|---|
| 10,141,010 B1 | 11/2018 | Nichols | |
| 10,248,664 B1* | 4/2019 | Shen | G06N 3/0454 |
| 10,257,072 B1 | 4/2019 | Salam | |
| 10,685,634 B2 | 6/2020 | Salazar et al. | |
| 10,809,890 B1 | 10/2020 | Krawczyk | |
| 2002/0099552 A1 | 7/2002 | Rubin et al. | |
| 2003/0233930 A1 | 12/2003 | Ozick | |
| 2004/0030691 A1 | 2/2004 | Woo | |
| 2005/0174923 A1 | 8/2005 | Bridges | |
| 2007/0083365 A1 | 4/2007 | Shmunk | |
| 2007/0119292 A1 | 5/2007 | Nakamura | |
| 2007/0124293 A1 | 5/2007 | Lakowske et al. | |
| 2008/0072741 A1 | 3/2008 | Ellis | |
| 2009/0317783 A1 | 12/2009 | Noguchi | |
| 2010/0169085 A1 | 7/2010 | Ranga Rao et al. | |
| 2014/0129235 A1 | 5/2014 | Suvanto | |
| 2016/0358594 A1 | 12/2016 | Hilderman et al. | |
| 2017/0292853 A1 | 10/2017 | Bostick et al. | |
| 2018/0122403 A1 | 5/2018 | Koretzky et al. | |
| 2018/0182366 A1 | 6/2018 | Salazar et al. | |
| 2018/0210952 A1 | 7/2018 | Takano | |
| 2019/0180142 A1 | 6/2019 | Lim et al. | |
| 2019/0208320 A1 | 7/2019 | Takahashi et al. | |
| 2019/0213279 A1* | 7/2019 | Kim | G06F 16/683 |
| 2020/0021873 A1* | 1/2020 | Swaminathan | G06Q 30/0276 |

FOREIGN PATENT DOCUMENTS

| | | |
|---|---|---|
| WO | WO2018/047643 A1 | 3/2018 |
| WO | WO2019/000054 A1 | 1/2019 |

OTHER PUBLICATIONS

Chen, Sih-Huei, et al. "Playing Technique Classification Based on Deep Collaborative Learning of Variational Auto-Encoder and Gaussian Process." 2018 IEEE International Conference on Multimedia and Expo (ICME). IEEE, 2018.*

Bretan, Mason, and Larry Heck. "Learning semantic similarity in music via self-supervision." methods 15.24 (2019): 25.*

Roche, Fanny, et al. "Autoencoders for music sound modeling: A comparison of linear, shallow, deep, recurrent and variational models." arXiv preprint arXiv:1806.04096 (2018).*

Jansson, "Joint Singing Voice Separation and F0 Estimation with Deep U-Net Architectures," Nov. 18, 2019, https://ieeexplore.ieee.org/document/4694852, 5 pgs.

Jansson, "Singing Voice Separation with Deep U-Net Convolutional Networks," Oct. 23-27, 2017, Proceedings of the 18th ISMIR Conference, Suzhou, China, 7 pgs.

Salamon, Melody, bass line, and harmony representations for music version identification, Proceeding of the 21st International World Wide Conference, Apr. 16, 2012, 8 pgs.

Singh, "Identifying the Genre of a Song with Neural Networks," Oct. 21, 2018, downloaded from https://medium.com/@navdeepsingh_2336/identifying-the-genre-of-a-song-with-neural-networks-851db89c42f0, 13 pgs.

Spotify AB, Extended European Search Report, EP20191993.3, dated Feb. 12, 2021, 8 pgs.

Spotify AB, Extended European Search Report, EP20212961.5, dated May 6, 2021, 5 pgs.

Stoller, "Wave-U-Net: A Multi-Scale Neural Network for End-to-End Audio Source Separation," 19th International Society for Music Information Retrieval Conference, Paris, France, Jun. 8, 2018, 7 pgs.

Uhlich, Improving Music Source Separation Based on Deep Neural Networks Through Data Augmentation and Network Blending, ICASSP 2017, © 2017 IEEE, 5 pgs.

Yu, "A Query-by-Singing System for Retrieving Karaoke Music," IEEE Transactions on Multimedia, vol. 10, Issue 8, Dec. 12, 2008, 12 pgs.

Emanuele Pollastri, "A Pitch Tracking Voice for Music Retrieval," IEEE, Sep. 2002, pp. 341-344 (Year: 2002).

Jansson, Office Action, U.S. Appl. No. 16/596,554, dated Oct. 25, 2021, 7 pgs.

Marchini, Office Action, U.S. Appl. No. 16/719,779, dated Nov. 2, 2021, 10 pgs.

* cited by examiner

DETERMINING MUSICAL STYLE USING A VARIATIONAL AUTOENCODER

RELATED APPLICATION

This application claims priority to U.S. Provisional Application No. 62/851,487, "Determining Musical Style using a Variational Autoencoder," filed on May 22, 2019, which is hereby incorporated in its entirety.

TECHNICAL FIELD

The disclosed embodiments relate generally to determining a representative vector that corresponds to a media item, and more specifically to using a variational autoencoder (VAE) to determine style information associated with a media item.

BACKGROUND

Access to electronic media, such as music and video content, has expanded dramatically over time. As a departure from physical media, media content providers stream media to electronic devices across wireless networks, improving the convenience with which users can digest and experience such content.

Media content streaming platforms provide users with the ability to access content items from large content collections. Navigating through large content collections to determine content of interest can be challenging for users. For example, although a platform may provide information about content items, such as song title, the provided information may be insufficient to help the user decide whether to play back the content. As the amount of media available to users increases, there is a need for systems that reduce the amount of input required from users to obtain content of interest.

SUMMARY

Accordingly, there is a need for systems and methods for determining a representative vector that corresponds to an audio content item (e.g., a music track). For example, a portion of an audio content item (e.g., a vocal portion, such as a vocal from a single vocalist, or an instrumental portion, such as a guitar portion or a drum set portion) is extracted from the audio content item. A segment (e.g., a five-second window) is determined within the extracted portion of the representation of the audio content item. A variational autoencoder (VAE) is applied to the segment to generate a vector (e.g., a representative vector). In some embodiments, multiple segments are determined within the extracted portion of the representation of the audio content item, and the VAE is applied to each of the segments to generate multiple vectors. An average (e.g., a geometric median) of the vectors is determined, and a representative vector is the vector of the multiple vectors that is the closest to the average. In some embodiments, representative vectors are determined for multiple audio content items (e.g. a set of content items stored in a database of a media content provider). The representative vectors for the multiple audio content items create a vector space in which distances between the vectors represent musical style similarity. The vector space is usable to provide information to a user about an audio content item. For example, to provide information about an audio content item to a user (e.g., to recommend, add to a playlist, or stream the audio content item to the user), one or more representative vectors that correspond to the user (e.g., representative vectors that correspond to audio content items in a user's listening history) are determined. An audio content item is selected for the user by determining a representative vector that meets similarity criteria for the one or more representative vectors that correspond to the user.

In accordance with some embodiments, a method is performed at a computer. The computer has one or more processors and memory storing instructions for execution by the one or more processors. The method includes receiving a first audio content item, extracting a portion from the first audio content item, applying a first process to generate a representation of the extracted portion, determining a first representative vector that corresponds to the first audio content item by applying a variational autoencoder (VAE) to a first segment of the representation of the audio content item, and storing the first representative vector that corresponds to the first audio content item.

In accordance with some embodiments, a server system includes one or more processors and memory storing one or more programs for execution by the one or more processors. The one or more programs include instructions for performing the operations of the method described above.

In accordance with some embodiments, a computer-readable storage medium has one or more processors and memory storing instructions that, when executed by an when executed by the one or more processors, cause the operations of the method described above be performed.

Thus, systems are provided with improved methods for determining information associated with media items.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first characteristic could be termed a second characteristic, and, similarly, a second characteristic could be termed a first characteristic, without departing from the scope of the various described embodiments. The first characteristic and the second characteristic are both characteristics, but they are not the same characteristic.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
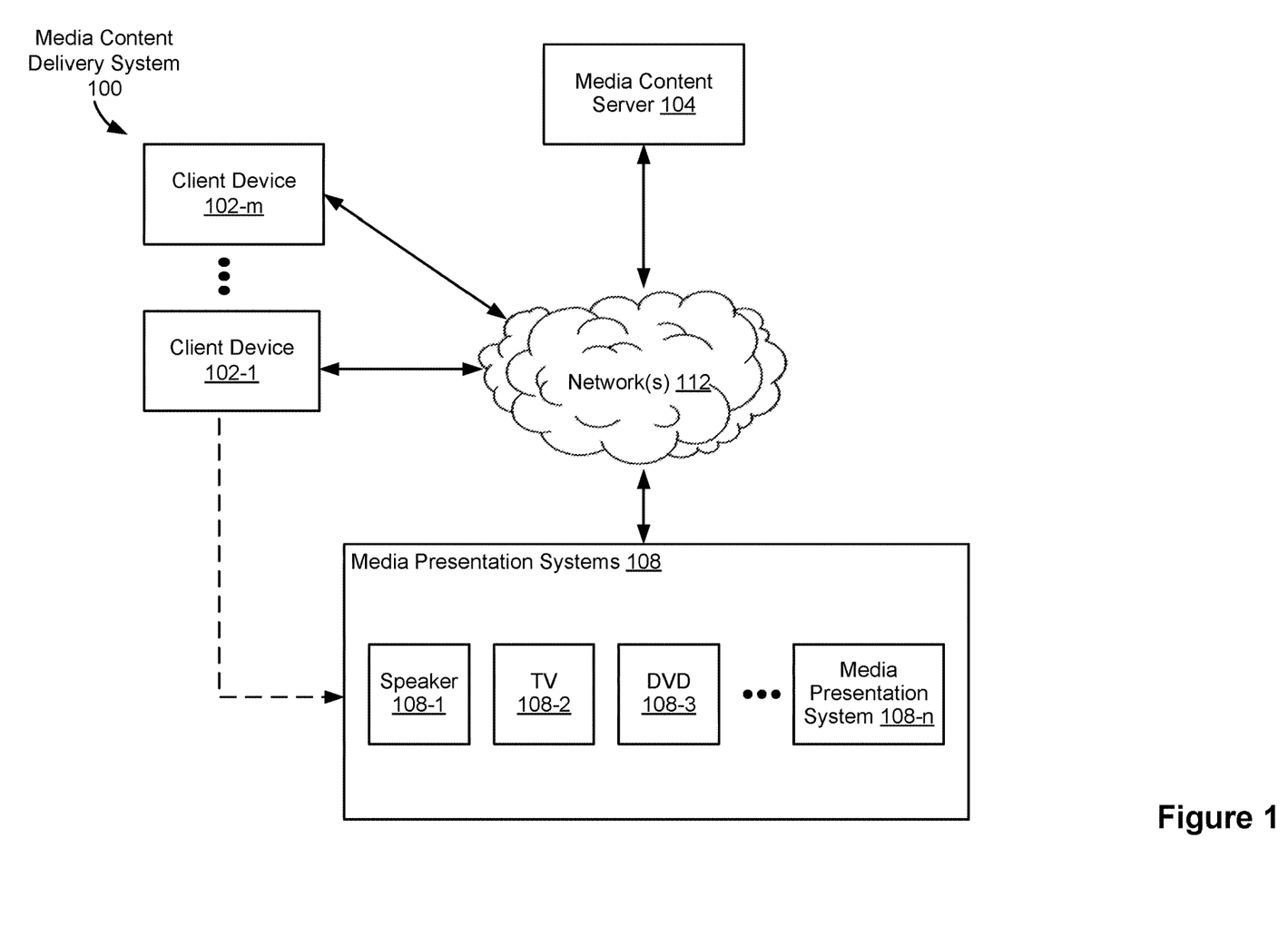
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more client devices 102 (e.g., client device 102-1 to client device 102-m, where m is an integer greater than one) and one or more media content servers 104. In some embodiments, media content delivery system 100 includes one or more media presentation systems 108, including speaker 108-1, television (TV) 108-2, digital versatile disk (DVD) player 108-3, and/or other media presentation system 108-n. The one or more media content servers 104 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102-1 or 102-m is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as music tracks, videos, etc.). A client device 102 may connect to a media presentation system 108 wirelessly or through a wired connection (e.g., directly through an interface, such as an HDMI interface). In some embodiments, a client device 102 is a headless client. In some embodiments, client devices 102-1 and 102-m are the same type of device (e.g., client device 102-1 and client device 102-m are both mobile devices). Alternatively, client device 102-1 and client device 102-m are different types of devices.

In some embodiments, client devices 102-1 and 102-m send and receive media-control information through the networks 112. For example, client devices 102-1 and 102-m send media control requests (e.g., requests to play music, movies, videos, or other media items, or playlists thereof) to media content server 104 through network(s) 112. Additionally, client devices 102-1 and 102-m, in some embodiments, also send indications of media content items (e.g., song 402, FIG. 4) to media content server 104 through network(s) 112. In some embodiments, the media content items are uploaded to client devices 102-1 and 102-m before the client devices forward the media content items to media content server 104.

In some embodiments, client device 102-1 communicates directly with media presentation systems 108. As pictured in FIG. 1, client device 102-1 is able to communicate directly (e.g., through a wired connection or through a short-range wireless signal, such as those associated with personal-area-network (e.g., BLUETOOTH/BLE) communication technologies, radio-frequency-based near-field communication technologies, infrared communication technologies, etc.) with media presentation systems 108, while client device 102-m communicates with the media presentation systems 108 through network(s) 112. In some embodiments, client device 102-1 uses the direct connection with media presentation systems 108 to stream content (e.g., data for media items) for playback on the media presentation systems 108.

In some embodiments, client device 102-1 and client device 102-m each include a media application 222 (FIG. 2) that allows a user of the client device to upload (e.g., to media content server 104), browse, request (e.g., for playback at the client device 102 and/or a media presentation system 108), and/or present media content (e.g., control playback of music tracks, videos, etc.). Media content may be stored locally (e.g., in memory 212 of the client device 102, FIG. 2) and/or received in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some embodiments, the media content server 104 stores and provides media content (e.g., media content requested by the media application 222 of client device 102-1 and/or 102-m) to client devices 102 and/or media presentation systems 108 via the network(s) 112. Content stored and served by the media content server 104 (also referred to herein as "media items"), in some embodiments, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "songs"). The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Figure 2:
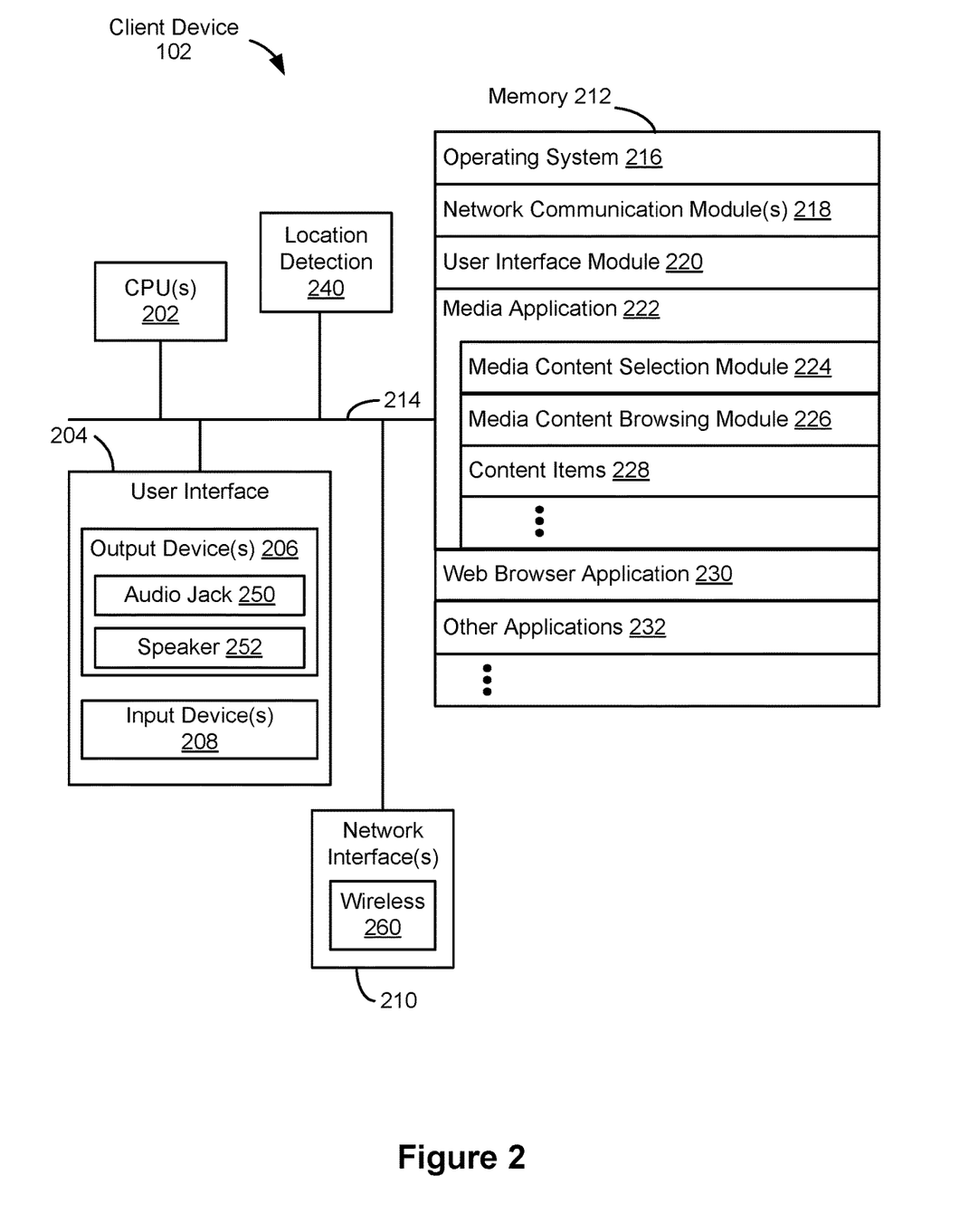
FIG. 2 is a block diagram illustrating a client device, in accordance with some embodiments.

FIG. 2 is a block diagram illustrating a client device 102 (e.g., client device 102-1 and/or client device 102-m, FIG. 1), in accordance with some embodiments. The client device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the client device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 240, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 210 include wireless and/or wired interfaces for receiving data from and/or transmitting data to other client devices 102, media presentations systems 108, a media content server 104, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation systems 108, media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application associated with and for accessing a content (i.e., media-providing) service provided by a media content provider such as media content server 104) for uploading, browsing, receiving, processing, presenting, and/or requesting playback of media (e.g., media items). In some embodiments, media application includes a media player, a streaming media application, and/or any other appropriate application or component of an application. In some embodiments, the media application 222 is used to monitor, store, and/or transmit (e.g., to media content server 104) data associated with user behavior. In some embodiments, the media application 222 includes a content-personalization module (e.g., analogous to the content personalization module 324, FIG. 3) and also includes the following modules (or sets of instructions), or a subset or superset thereof:

a media content selection module 224 for selecting one or more media content items and sending, to the media content server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for processing uploaded media items and storing media items for playback and/or for forwarding to the media content server;

a web browser application 230 (e.g., Internet Explorer or Edge by Microsoft, Firefox by Mozilla, Safari by Apple, or Chrome by Google) for accessing, viewing, and interacting with web sites; and other applications 232, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the media presentation system 108 is a type of client device 102, and includes some or all of the same components, modules, and sub-modules as described above in FIG. 2 with respect to the client device 102.

Figure 3:
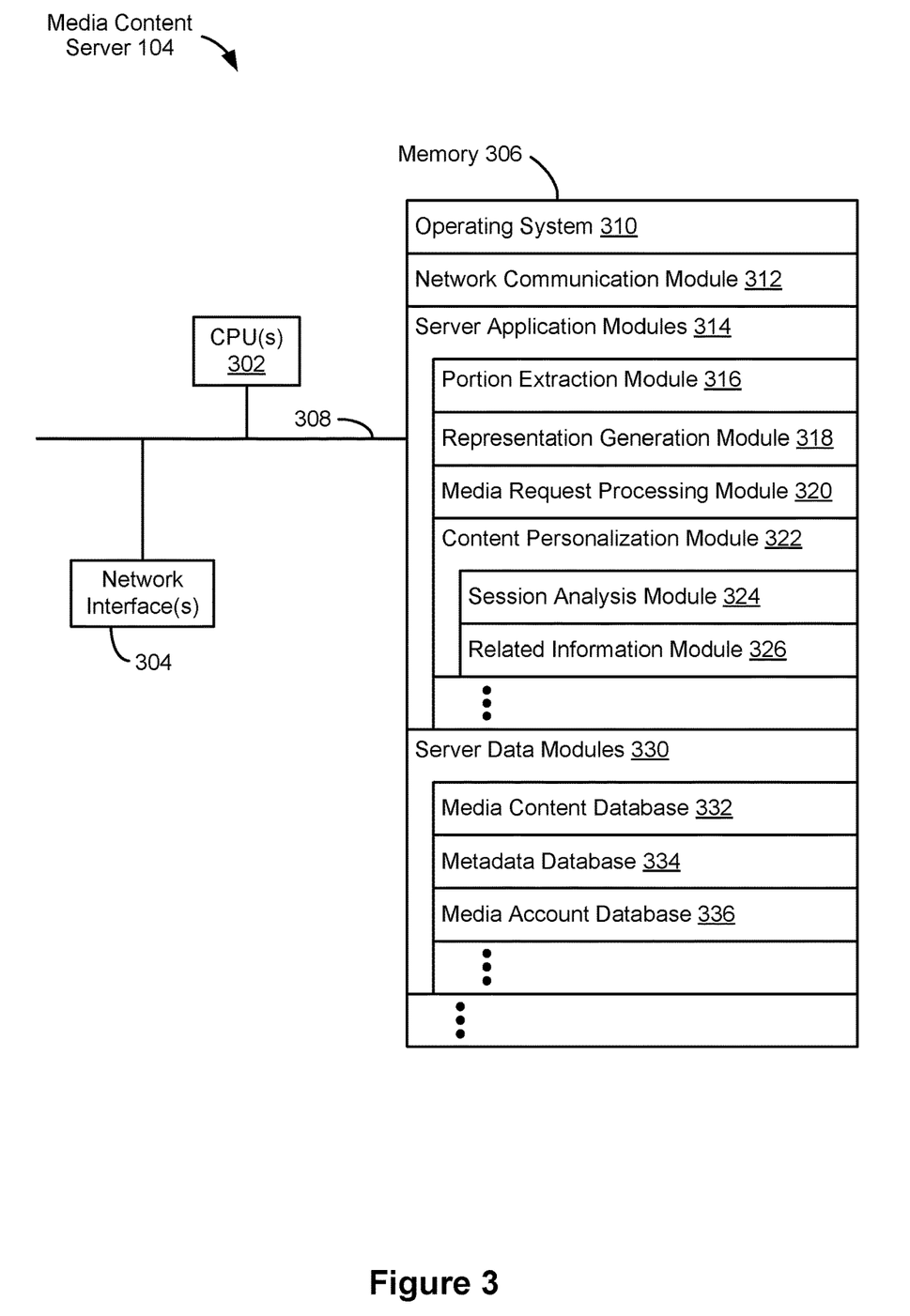
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a portion extraction module 316 (e.g., a separation model based on the U-net architecture);

a representation determination module 318 that determines representative vectors for media content items;

a media request processing module 320 for processing requests for media content and facilitating access to requested media content items by client devices (e.g., the client device 102) including, optionally, streaming media content to such devices and/or to one or more media presentation systems 108;

a content personalization module 322 for providing personalized content (e.g., playlists, tracks, advertisements, tooltips, notifications, etc.) to users of the content service, including, but not limited to, one or more of:

a session analysis module 324 for processing and storing data relating to listening sessions (e.g., a period of time a user engages with the media-providing service), including identifying media content items that are provided during listening sessions; and a related information module 326 for processing (e.g., identifying and/or storing) information related to one or more media content items (e.g., using representative vectors associated with respective media content items), and selecting and/or providing the metadata to a user;

one or more server data module(s) 330 for handling the storage of and access to media items and metadata relating to the media items; in some embodiments, the one or more server data module(s) 330 include:

a media content database 332 for storing media items (e.g., audio files, video files, text files, etc.);

a metadata database 334 for storing metadata relating to the media content items (e.g., vectors related to media content items and/or musical style information (e.g., vocal style or instrumental style) determined from the vectors); and a media account database 336 for storing account information for user media accounts, including user profiles, credentials (e.g., user identifiers, passwords, email addresses, etc.), credentials or identifiers of any linked accounts, and the like.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

Figure 4:
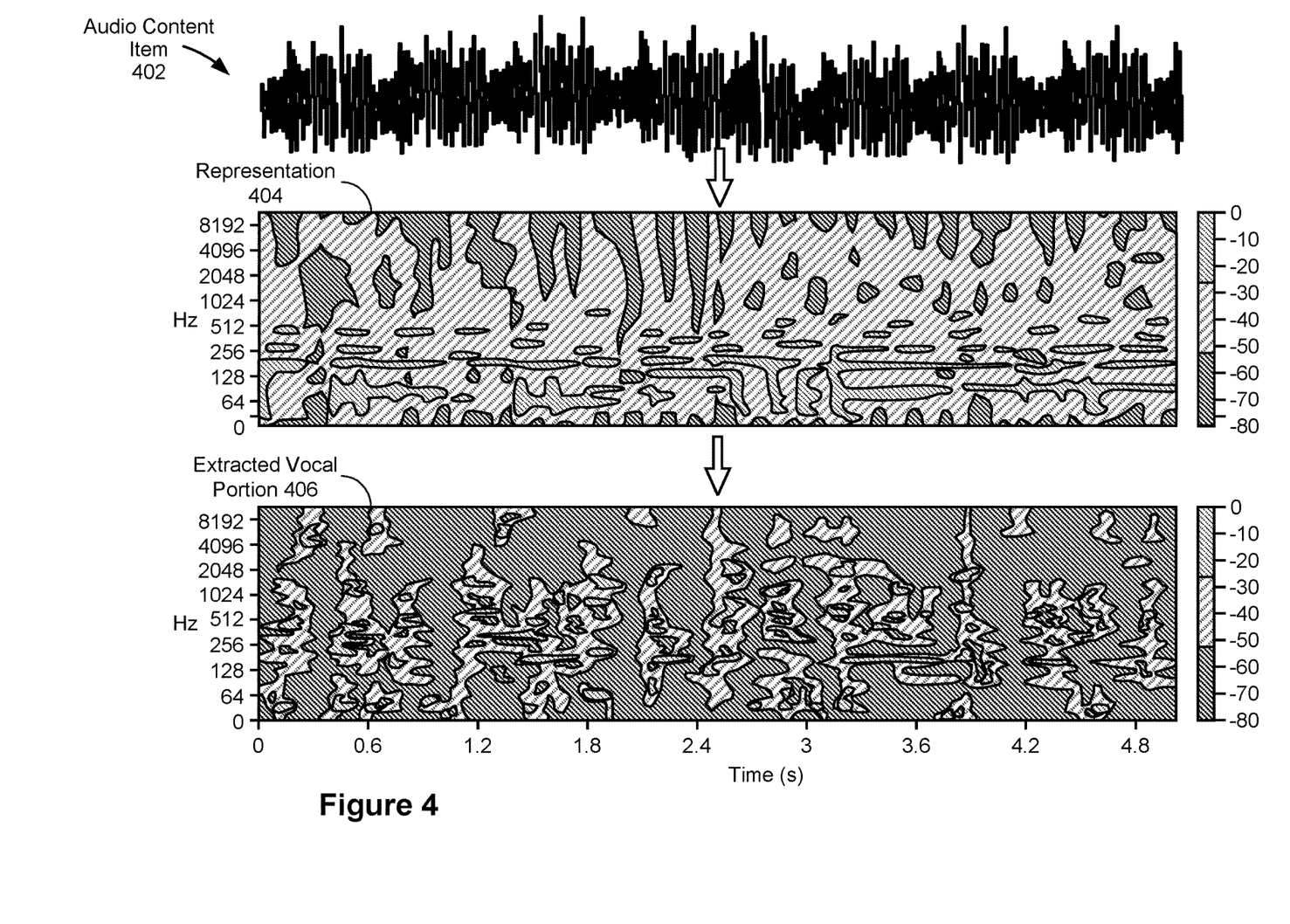
FIG. 4 illustrates extraction of a portion from an audio content item, in accordance with some embodiments.

FIG. 4 illustrates extraction of a portion from an audio content item, in accordance with some embodiments. Audio content item 402 (e.g., raw audio associated with an audio track or video item) is received (e.g., uploaded and/or retrieved from storage) by portion extraction module 316. A process is applied to audio content item 402 to generate a representation 404 (e.g., a spectrogram illustrating the spectrum of frequencies of the audio content item over time). For example, the representation 404 is generated by calculating Mel-frequency cepstrum coefficients (MFCCs) based on audio content item 402. An extracted vocal portion 406 (e.g., a voice of a single vocalist in an audio track) is generated by extracting a portion from the representation 404. For example, a U-net is applied to representation 404 to extract a voice from the representation 404. Examples of extracting a portion from the representation 404 using a U-net are described with reference to U.S. patent application Ser. No. 16/596,554, filed Oct. 8, 2019, which is incorporated herein by reference in its entirety. Extracted vocal portion 406 indicates a vocal portion of an audio content item 402. All of the other portions of audio content item 402 (e.g., guitar, bass, drums, and vocals from other voices) are substantially absent from vocal portion 402. For example, the extracted vocal portion 406 does not include instrumentals other than the vocals. In some embodiments, a U-net is applied to extract instrumentals (e.g., one or more sounds corresponding to one or more instruments) other than vocals in order to identify the vocals (e.g., by subtracting out the other instrumental audio sources). For example, the U-net is applied to a combination of instruments and/or is applied to a single instrument (e.g., guitar extraction).

One of ordinary skill in the art recognizes that the representations 404 and 406 are cartoon representations of spectrograms. An example of an actual spectrogram is illustrated in FIG. 4 of the above-referenced U.S. Provisional Application No. 62/851,487, which is incorporated in its entirety.

Figure 5:
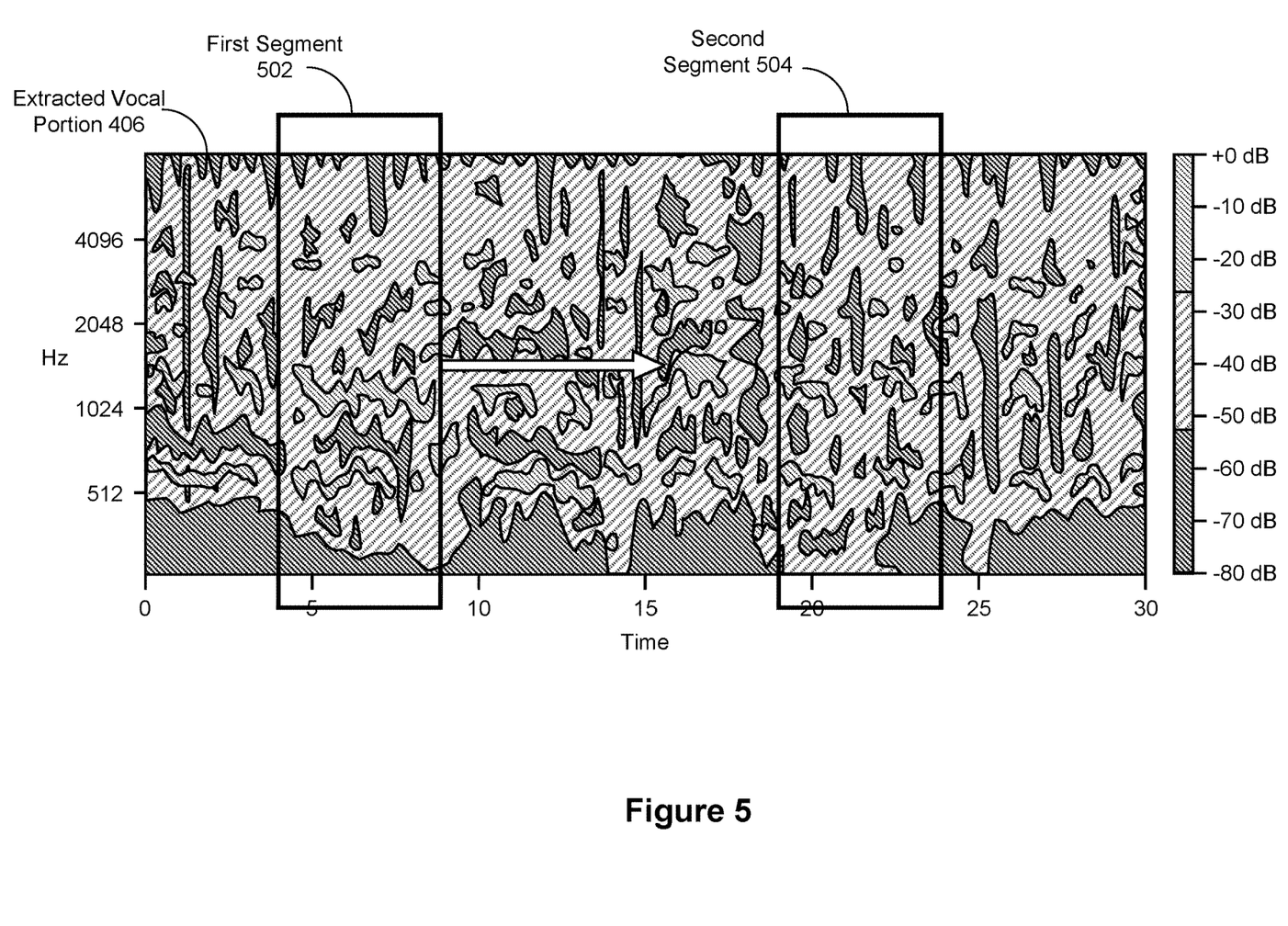
FIG. 5 illustrates a segment of an extracted portion of an audio content item, in accordance with some embodiments.

FIG. 5 illustrates a segment 502 of the extracted portion 406 of audio content item 402, in accordance with some embodiments. (Extracted portion 406 in FIG. 5 is the same as extracted portion 406 shown in FIG. 4, however, for illustrative purposes, extracted portion 406 in FIG. 5 is shown with a length of 30 seconds whereas extracted portion 406 in FIG. 4 is shown with a length of 5 seconds. It will be recognized that the total length of representation 404 and extracted portion 406 is typically equivalent to the length of audio content item 402. For example, if audio content item 402 has a length of three minutes, the length of representation 404 and extracted portion 406 is also three minutes.) In some embodiments, the extracted portion of the audio content item 402 is shorter than the length of the audio content item 402. For example, the extraction is performed on multiple portions of the audio content item (e.g., each portion is a predefined length), and the extraction of the multiple portions are later combined into a single representation. In some embodiments, the multiple portions at least partially overlap (e.g., in time, relative to the audio content item).

Segment 502 is a window (e.g., a 5-second window) sampled from the extracted portion 406. In some embodiments, a first segment of extracted portion 406 is sampled at a first position in extracted portion 406 (e.g., at five seconds after the beginning of extracted portion 406). In some embodiments, subsequent segments of extracted portion 406 are sampled at periodic intervals (e.g., starting at 10 seconds after the end of the previously sampled segment). For example, second segment 504 is sampled from a five-second window of extracted portion 406 at a time that begins 10 seconds after first segment 502 is sampled from a five-second window of extracted portion 406. In some embodiments, second segment 504 is sampled from a window of extracted portion 406 that overlaps with first segment 502. It will be recognized that the indicated time values for segment length, first segment start, and intervals between segments are merely examples and that other time values could be used.

Figure 6:
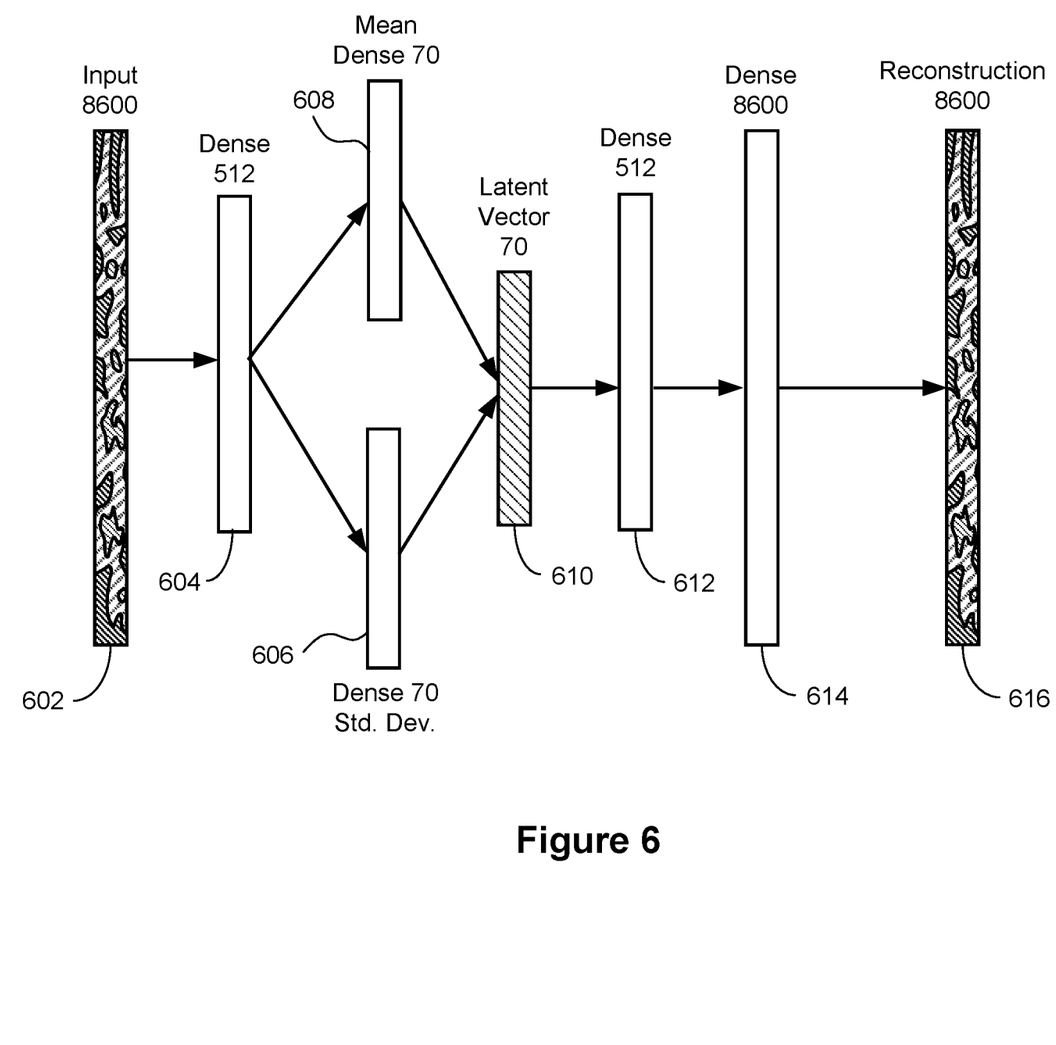
FIG. 6 illustrates application of a variational autoencoder (VAE) to a segment, in accordance with some embodiments.

FIG. 6 illustrates application of a VAE to segment 502, in accordance with some embodiments. In some embodiments, the VAE encodes segment 502 with a sample rate of 22 kHz and representations (e.g., MFCCs) are computed from the segment 502 to create a 20×430 matrix. The matrix is reshaped so that the input is an 8600-dim vector 602. The 8600-dimensional vector is passed into a 512-dim dense layer 604 with ReLu nonlinearity activation. The dense layer 604 is connected to two parallel 70-dim dense layers: mean layer 606 and standard deviation layer 608. Mean layer 606 and standard deviation layer 608 have linear activation to a 70-dim hidden layer (latent space), in which latent vector 610 occurs. A decoder takes latent vector 610, followed by a 512-dim dense layer 612 and ReLu nonlinearity, to an 8600-dim dense layer 614 followed by a sigmoid nonlinearity to reconstruct the data as vector 616.

Figure 7:
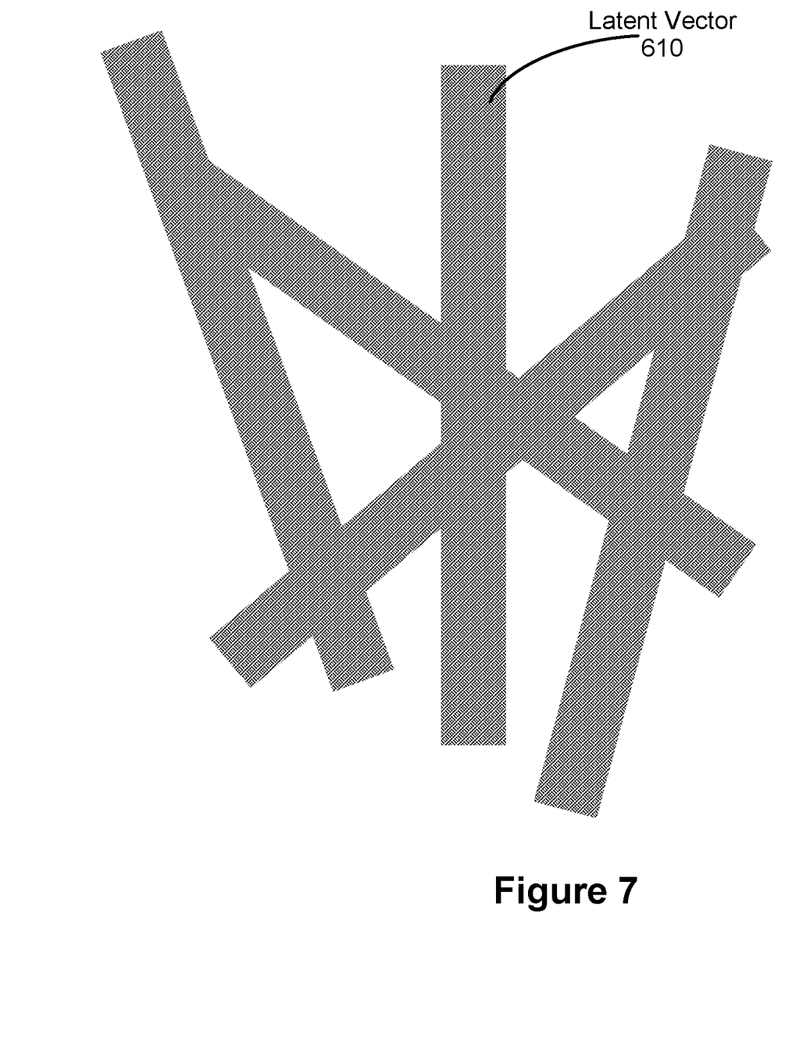
FIG. 7 illustrates multiple vectors determined using the VAE process.

FIG. 7 illustrates multiple vectors, including latent vector 610, determined using the VAE process as described with regard to FIG. 6. The multiple vectors correspond to multiple segments (including segments 502 and 504) sampled from extracted portion 406 as described with regard to FIG. 5. In some embodiments, an average (e.g., a geometric median) of the vectors is determined, and a representative vector (e.g., vector 610) is the vector of the multiple vectors that is the closest to the average. In this way, vector 610 is determined to be a representative vector of audio content item 402.

Figure 8:
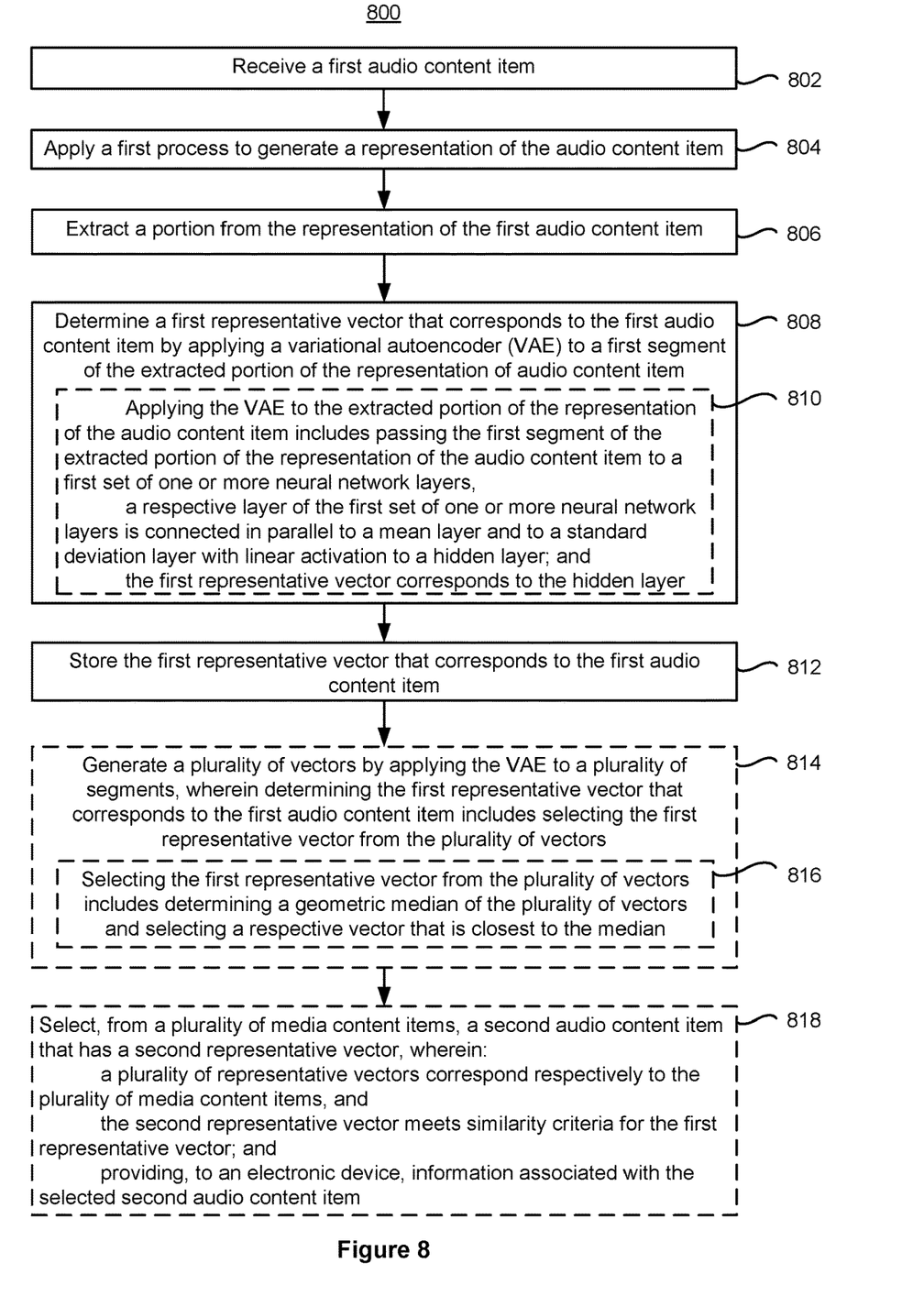
FIG. 8 is a flow diagram illustrating a method for determining a representative vector that corresponds to an audio content item.

FIG. 8 is a flow diagram illustrating a method 800 for determining a representative vector that corresponds to an audio content item, in accordance with some embodiments. Method 800 may be performed at a device, such as a computer system of a media-providing service (e.g., media content server 104, FIGS. 1 and 3), the computer system having one or more processors and memory storing instructions for execution by the one or more processors. The computer system provides media content for playback to client devices 102 and/or media presentation systems 108 in a media content delivery system 100, or executes an application for the media-providing service. In some embodiments, method 800 is performed by executing instructions stored in the memory of the computer system (e.g., in memory 306, FIG. 3). In some embodiments, the method 800 is performed by a combination of a server system and a client device. In supporting a media-providing service, the computer system provides tracks (e.g., media items) for playback to client devices 102 and/or media presentation systems 108 of the media content delivery system 100. While the method 800 is described as being performed for audio content items, it may be performed for other types of content items (e.g., video items).

The device receives (802) a first audio content item (e.g., audio content item 402).

The device applies (804) a first process to generate a representation (e.g., a matrix indicating energy distribution over frequency bands) of the first audio content item. In some embodiments, the first process uses Mel-frequency cepstrum coefficients (MFCCs) to generate the representation (e.g., representation 404 as described with regard to FIG. 4). To calculate MFCCs, the audio signal is broken into short frames of fixed time intervals and the Fourier transform is calculated. The energy is summed by applying the 128 mel filters to the power spectrum where the frequency bands are spaced equally to model the human auditory system' response. The logarithm is then computed on the filterbank energies. A subset of the discrete cosine transform coefficients are saved as MFCCs. In some embodiments, for each frame of the audio content item, the first process uses 20 MFCCs starting with the second coefficient to ignore scale.

The device extracts (806) a portion (e.g., a vocal portion 406 as described with regard to FIG. 4) from the representation of the first audio content item (e.g., representation 404). In some embodiments, the extraction is performed using a source separation model architecture is based on the U-Net architecture. The U-Net consists of a stack of convolutional layers that shrink the size of an input matrix to create a dense representation of the input and upsamples from the convolutional layers. For example, the stack of convolutional layers shrink the size of the input matrix of MFCCs through the network to create a dense representation of the input. From here the network upsamples from the layers back to the original size. The network sees a boost in performance when the skip connections are added across the layers which essentially reintroduce lost signal is from the input back into the reconstruction. The source separated model uses the $L_{1,1}$ norm loss function of the difference of the target output Y (separated audio) and original input X (full mix); f (X,Θ) is the output of the network for input X:

$$L(X,Y;\Theta)=\|f(X,\Theta)\odot(X-Y)\|_{1,1} \quad (1)$$

In some embodiments, the source separation model extracts a vocal and instrumental representation (5128)—

The device determines (808) a first representative vector (e.g., vector 610 as described with regard to FIG. 6) that corresponds to the first audio content item by applying a variational autoencoder (VAE) to a first segment (e.g., segment 502 as described with regard to FIG. 5) of the extracted portion of the representation of the audio content item. In some embodiments, the first segment is a portion, less than all, of the first audio content item. In some embodiments, the first segment is the whole first audio content item.

In some embodiments, an unsupervised approach with VAEs is used to learn distributions in the voice and/or instrumental space. In some embodiments, VAEs are trained with KL-divergence that penalizes the creation of small clusters unless the model can overcome the penalization with sufficient gains in the data reconstruction. This minimizes node activations and results in sparse solutions. Due to these properties of data sparsity, the model architecture produces a latent space where distances are suitable for similarity measurements and catalog indexing.

Autoencoders work by mapping the original data to a dense latent representation, and then from the latent space reconstructing the original data. Autoencoders are trained to minimize the loss in the reconstruction.

To construct the VAE an encoder and a decoder map input audio features to and from latent variables, z. In VAEs, the latent variable z is part of a probabilistic generative model. The decoder is defined by a likelihood function pθ (x|z), and the Gaussian prior is p(z) over latent variables. Then the encoder can be modeled with the posterior distribution:

$$p_\theta(z|x) \propto p(z)*p_\theta(x|z) \quad (2)$$

The constraints on the network force the generation of latent vectors that are roughly unit Gaussian. The loss function is the sum of two losses:

$$L(q)=-0.5*E_{q(z|z)}[\log p_\theta(x|z)]+KL[q_\phi(z|x)|p(z)] \quad (3)$$

To optimize the KL-divergence the encoder must generate means and standard deviations that can be used to sample latent vectors, as described with regard to FIG. 6.

In some embodiments, applying the VAE to the extracted portion of the representation of the audio content item includes (810) passing the first segment of the extracted portion of the representation of the audio content item to a first set of one or more neural network layers (e.g., layer 604). A respective layer (e.g., the final layer) of the first set of one or more neural network layers is connected in parallel to a mean layer (e.g., layer 608) and to a standard deviation layer (e.g., layer 606) with linear activation to a hidden layer and the first representative vector (e.g., vector 610) corresponds to the hidden layer. In some embodiments, the VAE is trained on a set of audio content items before being applied to the first audio content item.

The device stores (812) the first representative vector that corresponds to the first audio content item.

In some embodiments, the device generates (814) a plurality of vectors by applying the VAE to a plurality of segments (e.g., a segments 502 and 504). In some embodiments, determining the first representative vector that corresponds to the first audio content item includes selecting the first representative vector from the plurality of vectors.

In some embodiments, selecting the first representative vector from the plurality of vectors includes (816): determining a geometric median of the plurality of vectors, and selecting a respective vector that is closest to the median (e.g., based on cosine similarity). For example, the first representative vector (e.g., vector 610) is selected from a plurality of vectors as described with regard to FIG. 7.

In some embodiments, the device selects (818), from a plurality of media content items (e.g., a set or subset of media content items stored by a media providing service), a second audio content item that has a second representative vector. For example, a plurality of representative vectors correspond respectively to the plurality of media content items (e.g., media content items stored by media content database 332), and the second representative vector meets similarity criteria (e.g., has a lowest distance among the plurality of representative vectors) for the first representative vector. In some embodiments, the device provides, to an electronic device (e.g., client device 102), information associated with the selected second audio content item (e.g., providing a recommendation and/or streaming a track based on a degree of similarity to the first audio track). For example, content personalization module 322 provides the information associated with the selected second audio content item to the electronic device.

In some embodiments, the device indexes the plurality of media content items according to its respective representative vector. For example, properties of the representative vectors are weighted and sorted according to the properties. In some embodiments, a media content item of the plurality of media content items is associated with a genre and/or an artist. In some embodiments, the index for the plurality of media content items is based on the representative vector, genre and/or artist information.

In some embodiments, an audio content item may have multiple representative vectors that correspond to different vocals and instruments in the audio content item (e.g., a vocal representative vector, a guitar representative vector, a drum representative vector, etc.).

Figure 9:
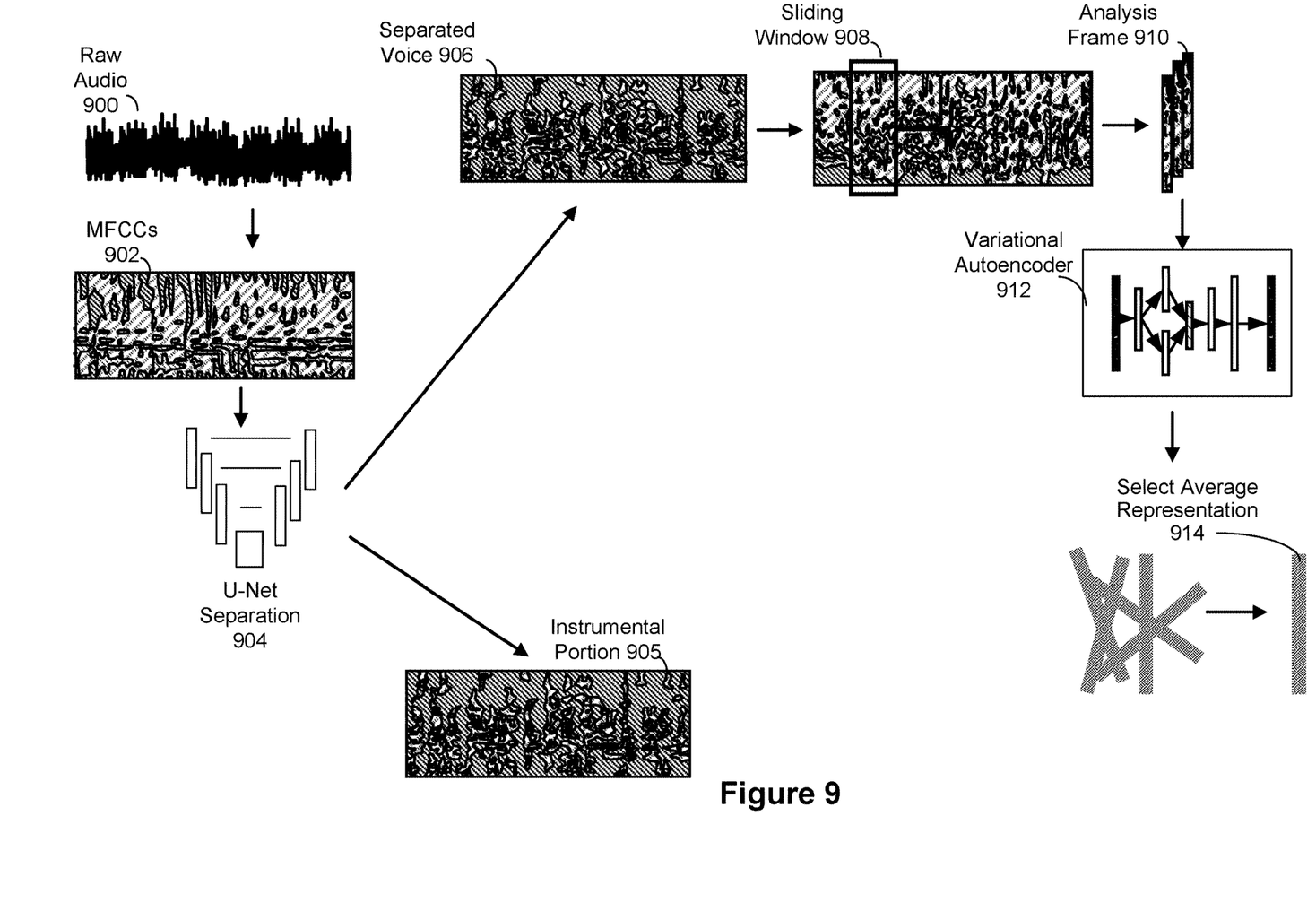
FIG. 9 illustrates a method of applying a VAE to determine a vocal style in accordance with some embodiments.

FIG. 9 illustrates vocal and instrumental style similarity pipelines with VAEs. For example, a voice (e.g., a singing voice) is extracted from raw audio data 900 (e.g., music) using a vocal source separation model (e.g., a U-Net 904). For example, the U-Net generates a separate instrumental portion 905 from the vocal portion (e.g., separated voice 906). In some embodiments, MFCCs 902 are computed on the vocal and instrumental audio parts (e.g., together). For the vocal portion (e.g., the MFCCs representing the separated voice 906), windows of a predetermined amount of time (e.g., 10 seconds wide) are sampled (e.g., into analysis frame). For example, sliding window 908 takes samples to generate an analysis frame 910. In some embodiments, the frames are embedded using a VAE 912. For example, the VAE works by mapping the original data (e.g., the input frame) to a dense latent representation, and then from the latent space reconstructs the original data. For example, the reconstructed frames are represented as vectors, and, from the set of vectors generated using the VAE, an average representation 914 (e.g., an average vector corresponding to one window) is selected to represent the style of the raw audio data (e.g., the song).

In some embodiments, the methods described herein use an unsupervised approach with VAEs to learn distributions in the voice and instrumental space. For example, Variational autoencoders (VAE) have been shown to be effective for learning complex multimodal distributions over large datasets. In some embodiments, VAEs are trained with KL-divergence that penalizes the creation of small clusters unless the model can overcome the penalization with sufficient gains in the data reconstruction. This minimizes node activations and results in sparse solutions. In some embodiments, the VAEs are used to produce a latent space where distances can be suitable for similarity measurements (e.g., vocal similarity) and catalog indexing.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising
at a computer system having one or more processors and memory storing instructions for execution by the one or more processors:
receiving a first audio content item;
applying a first process to generate a representation of the first audio content item;
extracting a vocal portion from the representation of the first audio content item;
determining a first representative vector that corresponds to a vocal style of the first audio content item by applying a variational autoencoder (VAE) to a first segment of the extracted vocal portion of the representation of the audio content item;
storing the first representative vector that corresponds to the vocal style of the first audio content item;
selecting, from a plurality of media content items, a second audio content item that has a second representative vector that corresponds to a vocal style of the second audio content item, wherein:
a plurality of representative vectors correspond respectively to the plurality of media content items, and
the second representative vector that corresponds the vocal style of the second audio content item meets similarity criteria with respect to the first representative vector that corresponds to the vocal style of the first audio content item; and
streaming, to an electronic device, the selected second audio content item.

2. The method of claim 1, wherein:
applying the VAE to the extracted vocal portion of the representation of the audio content item includes passing the first segment of the extracted vocal portion of the representation of the audio content item to a first set of one or more neural network layers,
a respective layer of the first set of one or more neural network layers is connected in parallel to a mean layer and to a standard deviation layer with linear activation to a hidden layer; and
the first representative vector corresponds to the hidden layer.

3. The method of claim 1, including generating a plurality of vectors for the first audio content item by applying the VAE to a plurality of segments of the first audio content item, wherein determining the first representative vector that corresponds to the vocal style of the first audio content item includes selecting the first representative vector from the plurality of vectors.

4. The method of claim 3, wherein selecting the first representative vector from the plurality of vectors includes:
determining a geometric median of the plurality of vectors, and
selecting a respective vector that is closest to the median.

5. The method of claim 1, wherein the extracted vocal portion from the representation of the first audio content item comprises a portion, less than all, of the first audio content item.

6. The method of claim 1, wherein the vocal style is described by the first representative vector according to a vocal style taxonomy determined from an unsupervised neural network.

7. The method of claim 1, wherein the VAE includes:
an encoder to map input audio features of the first segment of the extracted vocal portion of the representation of the audio content item to a latent representation; and
a decoder to reconstruct the first segment from the latent representation into the first representative vector.

8. A non-transitory computer-readable storage medium having one or more processors and memory storing instructions for execution by the one or more processors, including instructions for:
receiving a first audio content item;
applying a first process to generate a representation of the first audio content item;
extracting a vocal portion from the representation of the first audio content item;
determining a first representative vector that corresponds to a vocal style of the first audio content item by applying a variational autoencoder (VAE) to a first segment of the extracted vocal portion of the representation of the audio content item;
storing the first representative vector that corresponds to the vocal style of the first audio content item;
selecting, from a plurality of media content items, a second audio content item that has a second representative vector that corresponds to a vocal style of the second audio content item, wherein:
a plurality of representative vectors correspond respectively to the plurality of media content items, and
the second representative vector that corresponds the vocal style of the second audio content item meets similarity criteria with respect to the first representative vector that corresponds to the vocal style of the first audio content item; and
streaming, to an electronic device, the selected second audio content item.

9. A server system of a media-providing service, comprising:
one or more processors; and
memory storing instructions for execution by the one or more processors, including instructions for:
receiving a first audio content item;
applying a first process to generate a representation of the first audio content item;
extracting a vocal portion from the representation of the first audio content item;
determining a first representative vector that corresponds to a vocal style of the first audio content item by applying a variational autoencoder (VAE) to a first segment of the extracted vocal portion of the representation of the audio content item;
storing the first representative vector that corresponds to the vocal style of the first audio content item;
selecting, from a plurality of media content items, a second audio content item that has a second representative vector that corresponds to a vocal style of the second audio content item, wherein:
a plurality of representative vectors correspond respectively to the plurality of media content items, and
the second representative vector that corresponds the vocal style of the second audio content item meets similarity criteria with respect to the first representative vector that corresponds to the vocal style of the first audio content item; and
streaming, to an electronic device, the selected second audio content item.

* * * * *